Aug. 23, 1949.  W. H. SMITH  2,479,978
CIRCULAR AND CROSSCUT SAW GUMMER AND SHARPENER
Original Filed Nov. 26, 1946  4 Sheets-Sheet 1
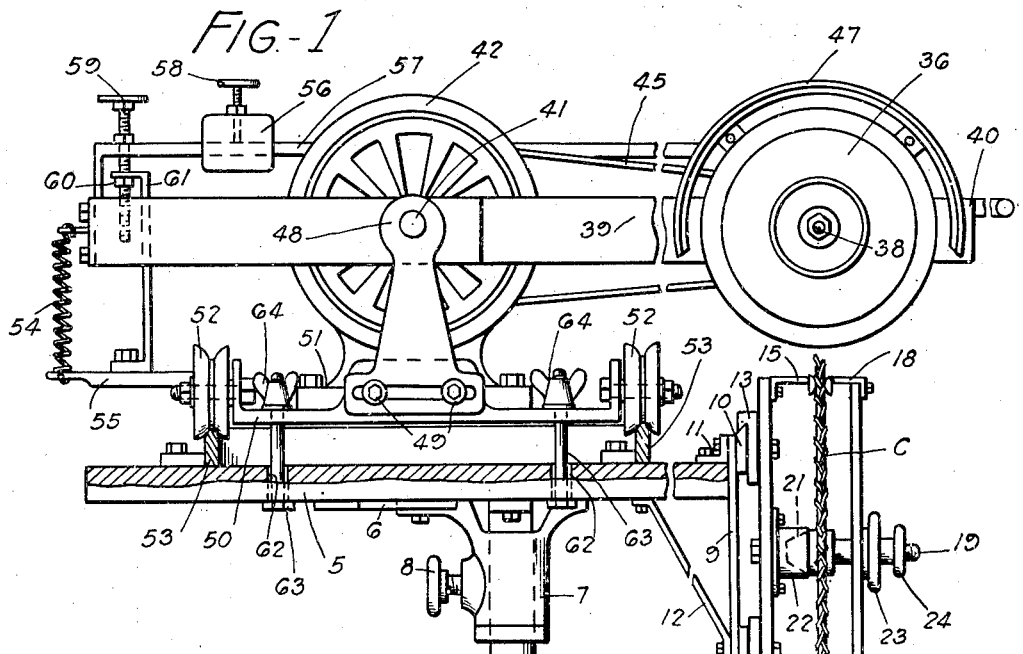
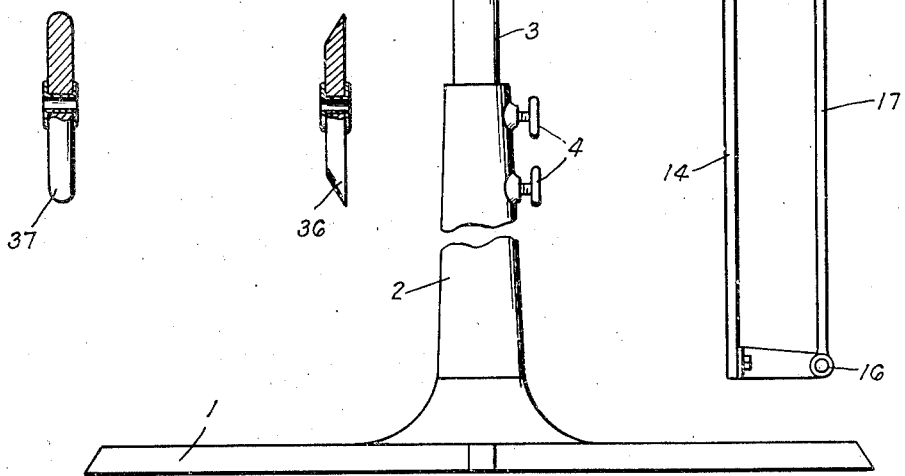
INVENTOR.
WILLIAM H. SMITH, DEC'D
BY MARY V. EuDAILEY, EX'TRIX,
BY Victor J. Evans & Co.
ATTORNEYS Aug. 23, 1949. W. H. SMITH 2,479,978
CIRCULAR AND CROSSCUT SAW GUMMER AND SHARPENER
Original Filed Nov. 26, 1946 4 Sheets-Sheet 2

INVENTOR.
WILLIAM H. SMITH, DEC'D
BY MARY V. EUDAILEY, EX'TRIX,
BY Victor J. Evans & Co.
ATTORNEYS

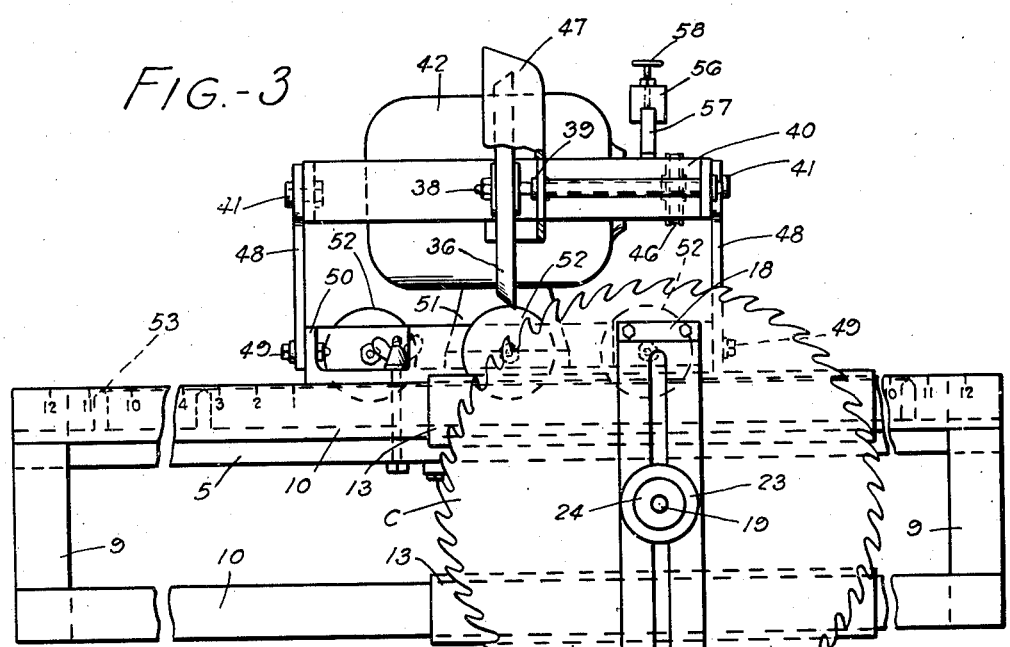
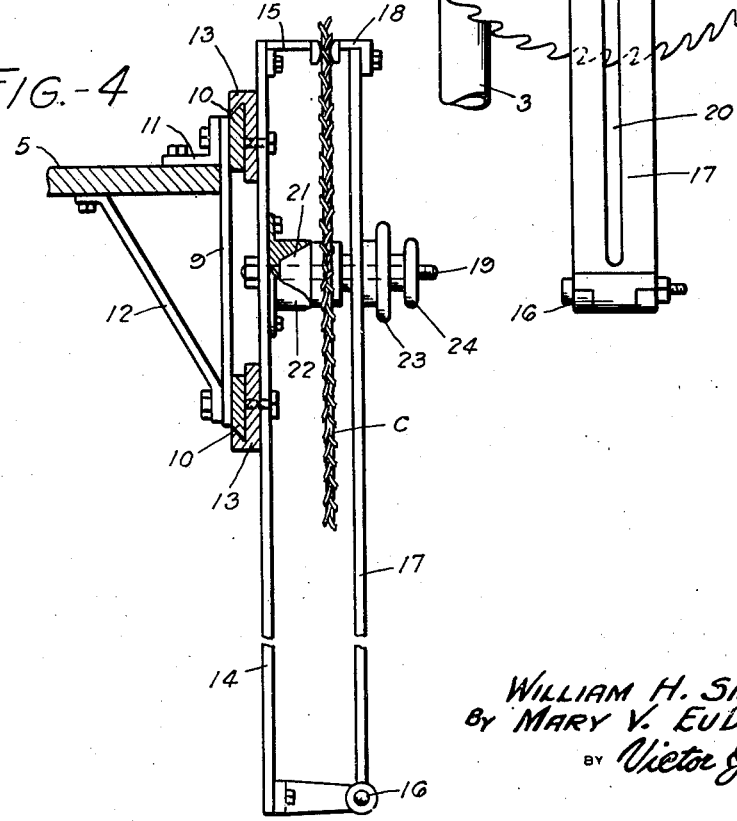

Aug. 23, 1949.  W. H. SMITH  2,479,978
CIRCULAR AND CROSSCUT SAW GUMMER AND SHARPENER
Original Filed Nov. 26, 1946  4 Sheets-Sheet 4
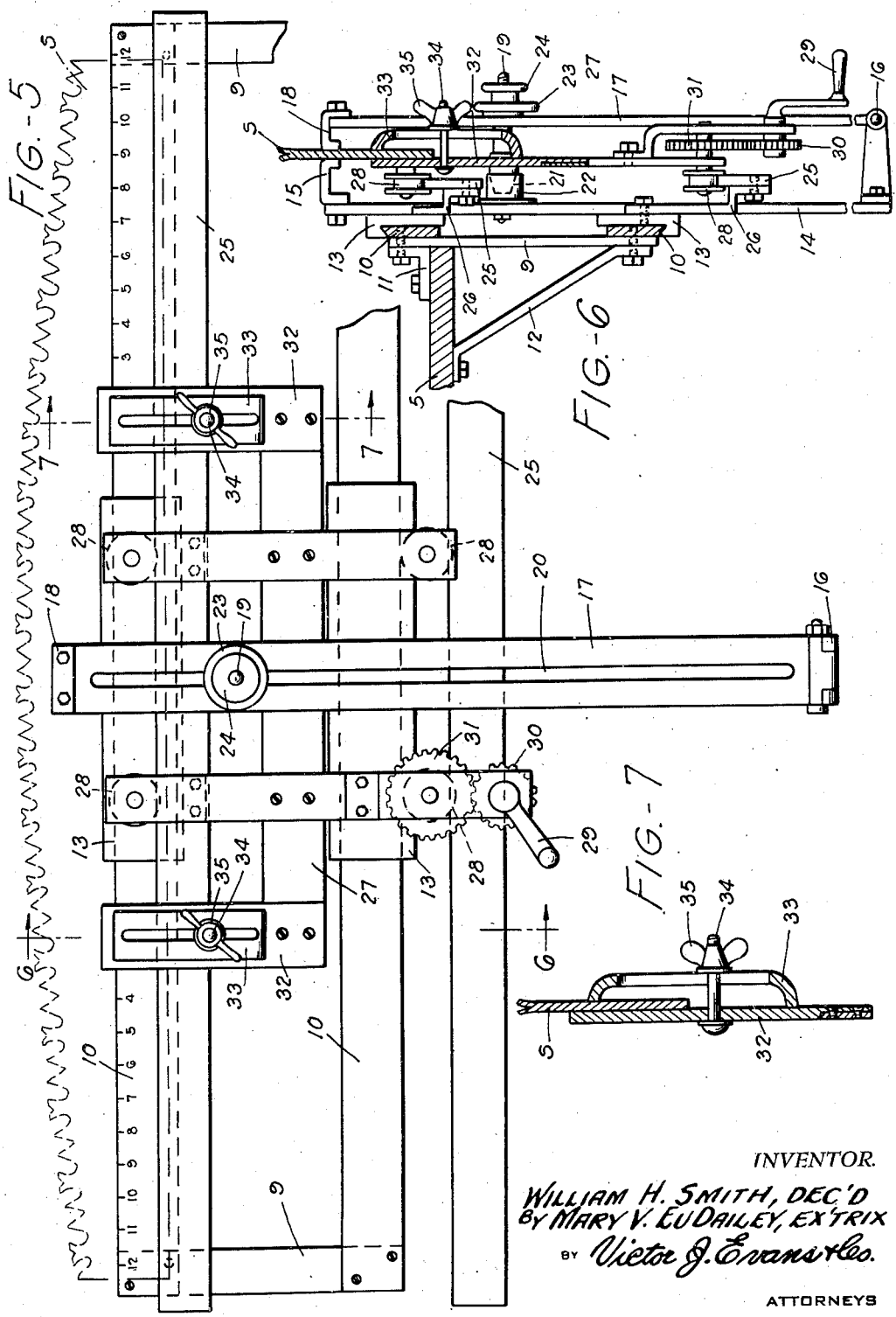
INVENTOR.
WILLIAM H. SMITH, DEC'D
BY MARY V. EUDAILEY, EX'TRIX
BY Victor J. Evans & Co.
ATTORNEYS Patented Aug. 23, 1949

2,479,978

UNITED STATES PATENT OFFICE 2,479,978

CIRCULAR AND CROSSCUT SAW GUMMER AND SHARPENER

William H. Smith, deceased, late of Clifton Forge, Va., by Mary V. EuDailey, executrix, Hot Springs, Va.

Substituted for application Serial No. 711,299, filed November 26, 1946. This application filed January 27, 1949, Serial No. 73,143

9 Claims. (Cl. 76—40)

The present invention relates to improvements in saw sharpening machines of the power operated type employing adjustable work holders and adjustable rotary tools, for cleaning, grinding, and setting rotary, as well as straight edge saws.

The present application is a substitute for abandoned application, Ser. No. 711,299, filed November 26, 1946.

The primary object of the invention is the provision of a machine tool of this type that is comparatively simple in construction and operation, and in which the rotary tool and the work holders may be adjusted with facility in adapting the machine for work on both circular and cross cut saws; and when the parts are so adjusted they perform their functions with accuracy and efficiency.

The invention consists essentially in certain novel combinations and compact arrangements of parts that render the machine interchangeable for use with different types of saws, and in combinations that facilitate the operation of the rotary grinding tool or tools, as will hereinafter be more fully set forth and claimed. The accompanying drawings illustrate one complete example of the physical embodiment of the invention wherein the parts are combined and arranged in accord with one mode thus far devised for the practical application of the principles of the invention, but it will be understood that changes and alterations may be made in these exemplifying drawings and mechanical structures within the scope of the appended claims without departing from the principles of the invention.

Figure 1 is a view in elevation of power operated saw sharpening machine, employing an electric motor, in which the invention is embodied, and disclosing a circular or rotary saw clamped in its work holder for action by the rotary grinding or sharpening tool.

Figure 3 is a view in front elevation of a portion of the machine tool with a circular saw mounted for sharpening.

Figure 4 is an enlarged detail vertical sectional view of the work supporting frame for use with a rotary or circular saw.

Figure 5 is an enlarged detail view in elevation of the work holder, supporting frame, and carriage for a straight or cross cut saw.

Figure 6 is a vertical sectional view as at line 6—6 of Fig. 5 showing a cross cut saw clamped and mounted in its work holder and carriage.

Figure 7 is an enlarged detail view in section of the central clamp for a rotary saw.

Figure 8 is an enlarged detail view, partly in section, of a grinding wheel for de-gumming the teeth of a saw; and Figure 9 is a similar view of one of the interchangeable rotary sharpening wheels or grinding wheels for use in the machine.

Figure 2:
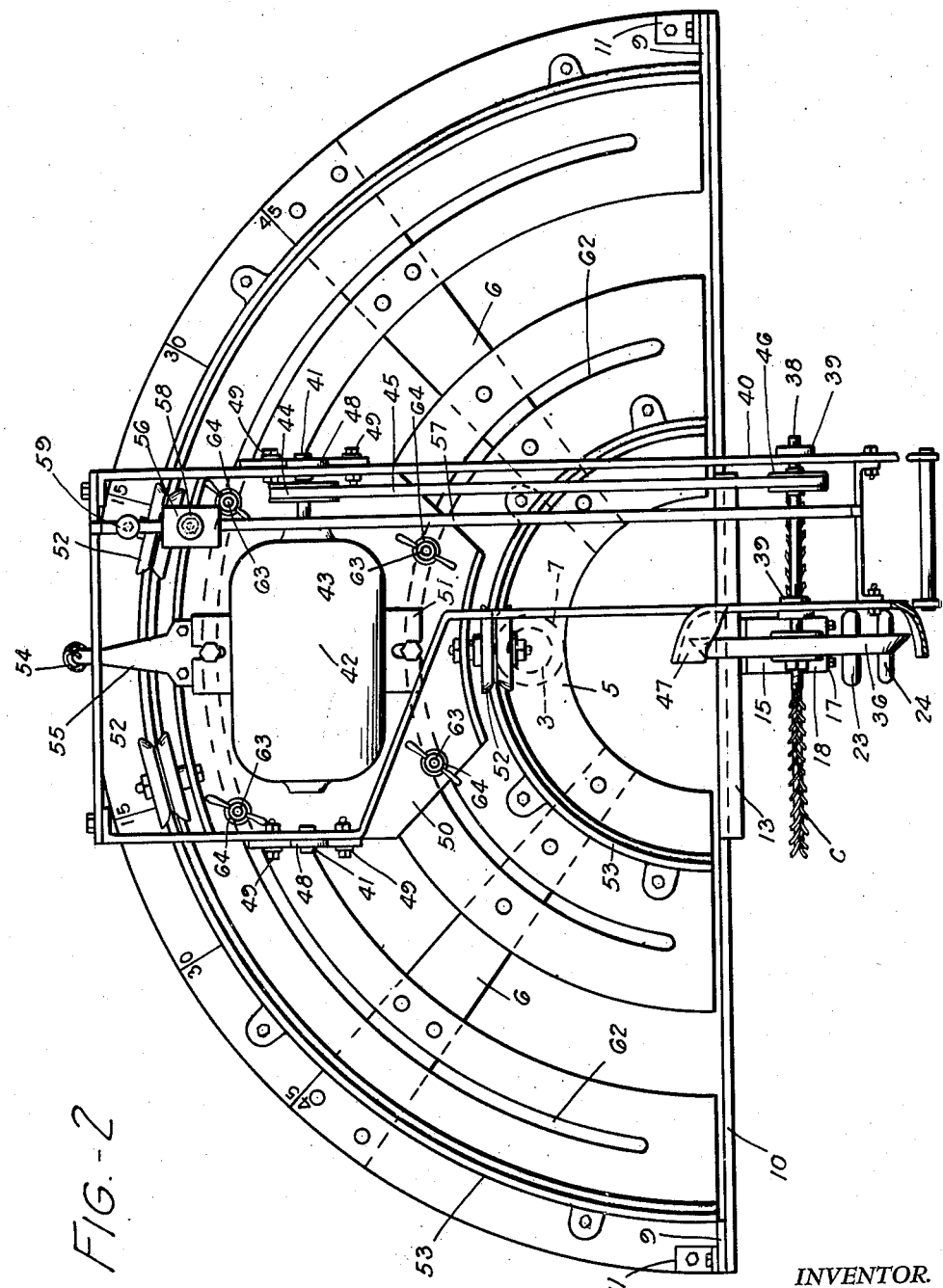
Figure 2 is a top plan view of the machine of Figure 1, with some parts omitted.

In the assembly view Fig. 1, utilizes a substantial base 1 having an upright tubular post 2 in which is mounted a vertically adjustable, telescoping pedestal 3, which may be fixed in adjusted position by means of a set screw or bolt 4.

A rotatably adjustable supporting table 5, in the form of a quadrant, or semi-circular, horizontal plate, and including spokes or radial braces 6 is mounted with a swivel head 7 upon the upper end of the pedestal, and the head, is fixed in adjusted position by means of a set screw 8.

As indicated in the top plan view Figure 2, the axial center of the horizontal table, and the vertical axis of the pedestal and swivel head are arranged in parallelism, but offset and spaced apart. The turn table is provided with a diametrically arranged edge frame of rectangular shape, disposed in a vertical plane, with a major portion of its height located below the table.

The edge frame, or attaching frame, which includes two upright end posts 9, 9, and two horizontal rails 10, 10 is secured to the table in suitable manner, as by angle brackets 11, and diagonal braces 12, and for use in grinding or sharpening the teeth of a circular saw C in Fig. 1, or the teeth of a cross cut saw S in Fig. 5, the saw is mounted in upright position, and the work holder is suspended from the edge plate 9—10.

In Figs. 1, 2, and 3 the circular saw C is mounted in a work holder that includes a horizontally adjustable work frame of which the two rails 13, 13 are mounted on the edge frame with dove-tail joints, and the holder for the circular saw consists of an upright base plate 14 bolted to the two rails 13, 13, and the upper end of the base bar 14 is provided with a fixed jaw 15 for engagement by the flat inner side of the saw C.

At its lower end the base bar 14 is provided with a fixed bracket and a hinge joint or pivot joint 16 for a slotted clamp bar 17 having at its upper end a movable clamp jaw 18 for co-action with the outer flat face of the saw. This clamp or saw-holder, in the nature of a vise is closed or clamped upon the saw by means of a stud bolt 19, removably anchored to the base bar 14, and upon which the saw, by means of its central arbor hole, is mounted. The clamp bolt also projects through a vertical slot 20 in the clamp bar 17, and for rigidly clamping the saw in place for action by the rotary grinding tool, a tapered head 21 on the bolt seats in a socket-head 22 of the base bar at the inner side of the saw. At the outer side of the saw two clamp nuts 23, and 24 are mounted on the bolt to bear against the saw and the slotted clamp bar and by tightening the nuts the saw at both its center and at its periphery is rigidly clamped for grinding or cleaning operations of its teeth.

For presenting successive teeth to the grinding tool the circular saw may be repeatedly clamped and released and turned on the bolt as a center for bringing successive teeth to the axial center of the semi-circular work table over which the rotary tool operates.

The work holder and its clamping devices may readily be adjusted to receive and support circular saws of different diameters and sizes, and the clamping devices are interchangeable and adjustable for use with various types of saws.

For use in grinding or sharpening the teeth of a straight edge saw, or a cross cut saw S, means are provided for longitudinal and horizontal adjustment of the saw in order to successively present its teeth to the overhead rotary grinding tool of the machine at the center axis of the semi-circular turn table. For this purpose the rectangular or oblong shaped and open work-frame with its rails 13, 13 mounted on the edge frame is fashioned with a pair of vertically spaced horizontal track rails 25, 25 attached by brackets 26 to the outer sides of the rails 13, and a saw-carriage 27 for the cross cut saw is mounted by rollers 28 for adjustment on the track rails.

The carriage is adjusted by turning a hand crank 29 and its pinion 30 journaled on the carriage, and a driven gear 31 also journaled on the carriage with one of the rollers transmits power and movement to the carriage.

In addition to the main, centrally located hinged work holder or vise 14—17 for the cross cut saw, the carriage is also provided with a pair of spaced, quick detachable, clamps for the saw, each of which includes a rigid base plate 32 and a slotted clamp jaw 33, together with a bolt 35 mounted on the base plate and projecting through the slotted jaw for clamping action by a wing nut 35.

By means of these adjustable parts of the machine the saw may intermittently be adjusted to present successively the saw teeth to the rotary sharpening tool 36, or to a cleaning rotary disk 37 in Fig. 8 when such a tool is required for removing material from the saw teeth.

The rotary sharpening tool 36, which is one of a set of interchangeable tools adapted for different purposes, is here shown with a bevel periphery for engagement with the teeth of the saw, and it is supported from the top of the rotatably adjusted table in position for additional adjustments, both vertically and laterally, required for sharpening the saws. To facilitate this adjustment, the quadrant shaped table is provided in Fig. 2, with an annular scale ranging through an angle of forty five degrees for governing the pitch of the bevel that is to be imparted to the saw teeth by the rotary disk or tool.

The rotary grinding tool is journaled with its shaft 38 in bearings 39 in a counterbalanced, tilting, or rocking frame 40, and the frame is pivoted at 41 in bearings that are axially alined with the axis of an electric motor 42 and its shaft 43 that provide power for operating the rotary tool. From the motor shaft a drive wheel 44 and belt 45 transmit power and motion to a driven wheel 46 of the rotary tool shaft for action of the wheel on the saw teeth, and a suitable guide or guard 47 is provided for the rotary tool, as shown.

The bearings 41 for the tiltable or rocking frame are mounted in upright brackets 48 that are horizontally slotted and retained in adjusted position by means of bolts 49 upon an annularly adjustable or swinging bed plate 50 that may be swung to adjusted position about the diametrical center point of the semi-circular turn table.

The motor 42 is mounted, with its axis transversely of the straight or diametrical edge of the table, by its base 51 upon the top of the bed plate, and the bed plate is provided with supporting rollers 52 that roll over as pair of semi-circular tracks 53 rigidly mounted on the table top.

The rocking or tilting frame for the rotary tool, at its rear end, is connected by a spring 54 to a bracket 55 of the bed plate to resiliently uphold the front portion of the frame and the tool, and a counterbalancing weight 56 is mounted to slide for adjustment on an arm or bar 57 that is supported in elevated position above the frame, and the weight may be fixed in adjusted position by means of a set screw or bolt 58.

By means of a screw bolt 59 journaled in the counterbalancing arm 57, and projecting downwardly for co-action with a fixed nut 60 on a bracket 61 of the bed plate, the resiliently mounted and tiltable tool frame may be adjusted in a vertical plane to raise or lower the rotary tool with relation to the saw teeth to be sharpened.

The circumferentially adjustable bed plate and the operating parts mounted thereon, may be swung upon its rollers about the diametrical working center of the semi-circular table, and the table is provided with spaced concentric slots 62 to accommodate bolts 63 that pass through the slots and through holes in the bed plate, and wing nuts 64 on the upper ends of the bolts clamp the bed plate in adjusted position.

As thus shown and described it will be apparent that the rotary tool and its operating parts may, with facility and accuracy, be adjusted in various directions about the diametrical working center of the semi-circular table to bring the rotary tool within a wide range of positions with relation to the teeth to be sharpened.

What is claimed is:

1. In a power operated saw-sharpening machine of the rotary tool type, the combination with a semi-circular table, a diametrical working center portion on said table, and work holding means mounted on the edge face of the diametrical portion of the table, of a bed-plate circumferentially adjustable about the center and mounted on the table, a tool frame pivotally mounted on the bed plate, a rotary tool mounted in said frame, an operating motor mounted on the bed plate with the shaft of said motor axially aligned with the axis of the tool frame pivot, and driving means operatively connecting the motor with the rotary tool.

2. In a power operated saw-sharpening machine of the rotary-tool-type the combination with a table, a diametrical working center portion on said table, and work-holding means mounted on the edge face of the diametrical portion of the table, of a bed plate circumferentially adjustable about the center and mounted on the table, a tool frame pivotally mounted on the bed plate and a rotary tool mounted therein, a resilient connection between the frame and bedplate, means for counterbalancing the tool frame, an operating motor mounted on the bed plate with its shaft axially alined with the axis of the tool frame pivot, and driving means operatively connecting the motor with the rotary tool.

3. In a power operated saw sharpening machine of the rotary tool type, the combination with a semi-circular table concentric grooves and a diametrical working center portion on said table, and work-holding means mounted on the edge face of the diametrical portion of the table, of a bed plate having supporting rollers and concentric tracks on the table for said rollers, set bolts connecting the bed plate with the grooved portions of the table, a tool frame pivotally mounted on the bed plate and a rotary tool mounted in the frame, an operating motor mounted on the bed plate with the shaft of said motor axially alined with the axis of the tool frame pivot, and driving means between said motor and the rotary tool.

4. In a machine tool as described, the combination with a table, a diametrical working center portion on said table, and work-supporting means mounted on the edge of the diametrical portion of the table, of a circumferentially adjustable bed plate mounted on the table and means for securing the plate in adjusted position, a tool frame pivotally mounted on the bed plate and a rotary tool mounted therein, logitudinally adjustable bearings for said frame mounted on the bed plate, means for counterbalancing said frame, an operating motor mounted on the bed plate with the shaft of the motor axially alined with the axis of the pivot of the pivotal frame, and driving means operatively connecting the motor with the rotary tool.

5. The invention as in claim 4 wherein said work supporting means comprises an upright base plate having a fixed clamping jaw, a clamp plate pivotally mounted on the base plate and having a movable jaw, and means for clamping the jaws upon a tool.

6. The invention as in claim 3 wherein said work holding means comprises an upright base bar having a fixed clamping jaw and a pivoted clamp plate having a movable jaw, a clamp bolt mounted in said bar and plate for supporting a tool, means for rigidly retaining the bolt and tool in the bar and plate, and means for clamping the jaws upon said tool.

7. A power operated saw sharpening machine comprising a table, a rail at an edge of the table, a bed plate mounted on the table for angular adjustment thereon about a point between the ends of the rail, a tool frame pivotally mounted on the bed plate, a rotary tool mounted in said frame, an operating motor mounted on the bed plate with the shaft of said motor axially alined with the axis of the tool frame pivot, driving means operatively connecting the motor with the rotary tool and saw carrying means suspended from the rail and movable thereon laterally with relation to the point about which the bed plate is adjustable to position the same in proper relation to the tool.

8. The invention as in claim 7 wherein the saw carrying means comprises an upright base plate having a fixed clamping jaw, a clamp plate pivotally mounted on the base plate and having a movable jaw, and means for clamping the jaws upon a saw.

9. The invention as in claim 7, wherein there is provided a resilient connection between the tool frame and the bed plate, means for counterbalancing the tool frame and longitudinally adjustable bearings for said tool frame mounted on said bed plate.

MARY V. EuDAILEY,
*Executrix of the Estate of William H. Smith, Deceased.*

REFERENCES CITED

The following references are of record in the file of this patent:

UNITED STATES PATENTS

| Number | Name | Date |
|---|---|---|
| 261,624 | Olney | July 25, 1882 |
| 545,064 | Fleck | Aug. 27, 1895 |
| 1,131,030 | Beers | Mar. 9, 1915 |
| 1,182,615 | Armstrong | May 9, 1916 |
| 1,561,863 | Kmentt | Nov. 17, 1925 |
| 1,674,853 | Collier | June 26, 1928 |
| 1,728,393 | Collier | Sept. 17, 1929 |
| 1,773,679 | Jackson et al. | Aug. 19, 1930 |
| 1,813,825 | Stauder | July 7, 1931 |
| 1,831,204 | Stauder | Nov. 10, 1931 |
| 2,238,704 | Miller | Apr. 15, 1941 |
| 2,308,053 | Carlson | Jan. 12, 1943 |
| 2,310,517 | Collier | Feb. 9, 1943 |
| 2,319,437 | Biasotti | May 18, 1943 |
| 2,325,622 | Murray | Aug. 3, 1943 |